Dec. 12, 1967  J. J. SIMOLKA  3,357,497
SIDEWALK EDGER
Filed May 4, 1965  2 Sheets-Sheet 1
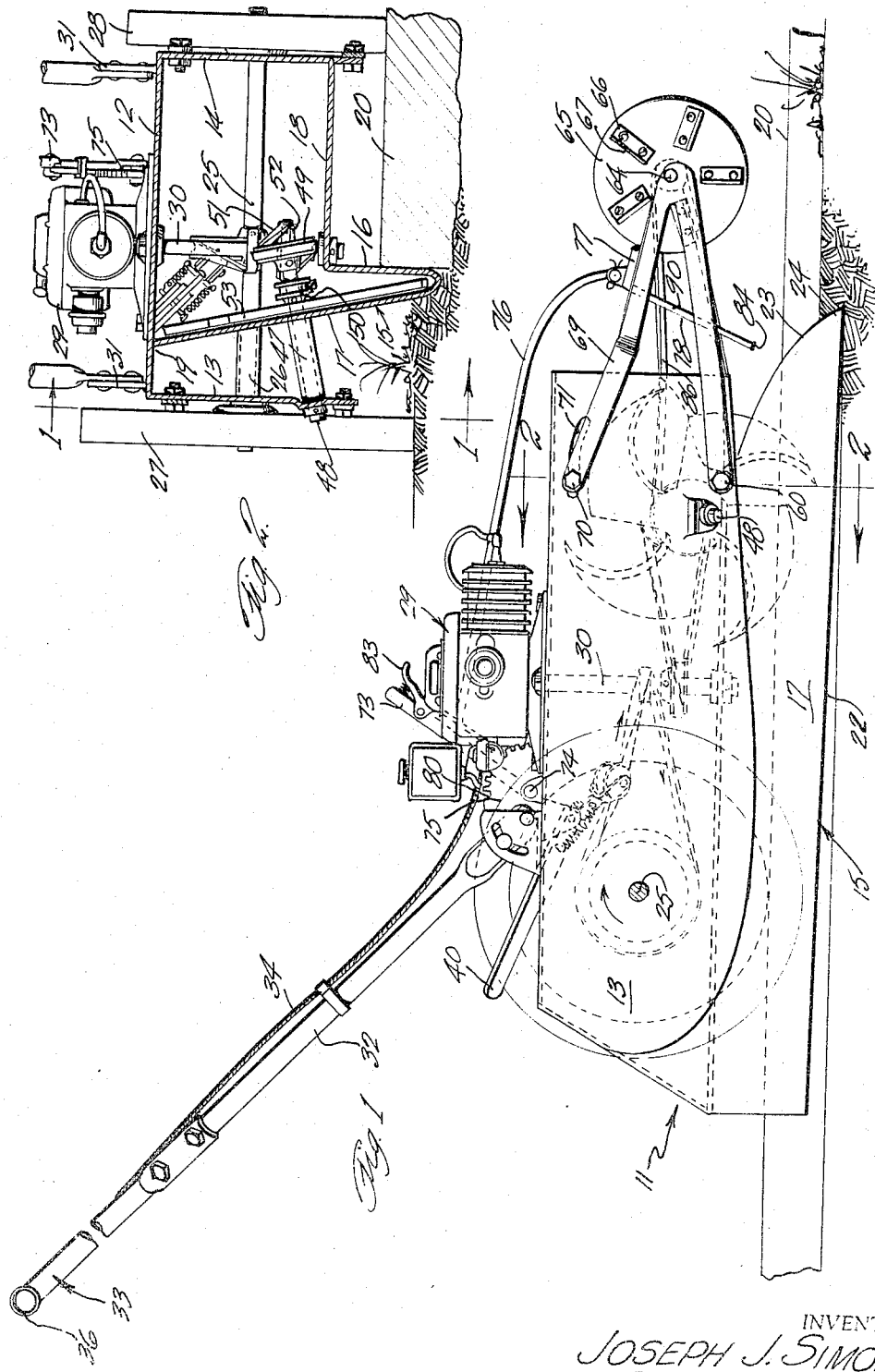
INVENTOR.
JOSEPH J. SIMOLKA
BY
Berman, Davidson & Berman
Attorneys

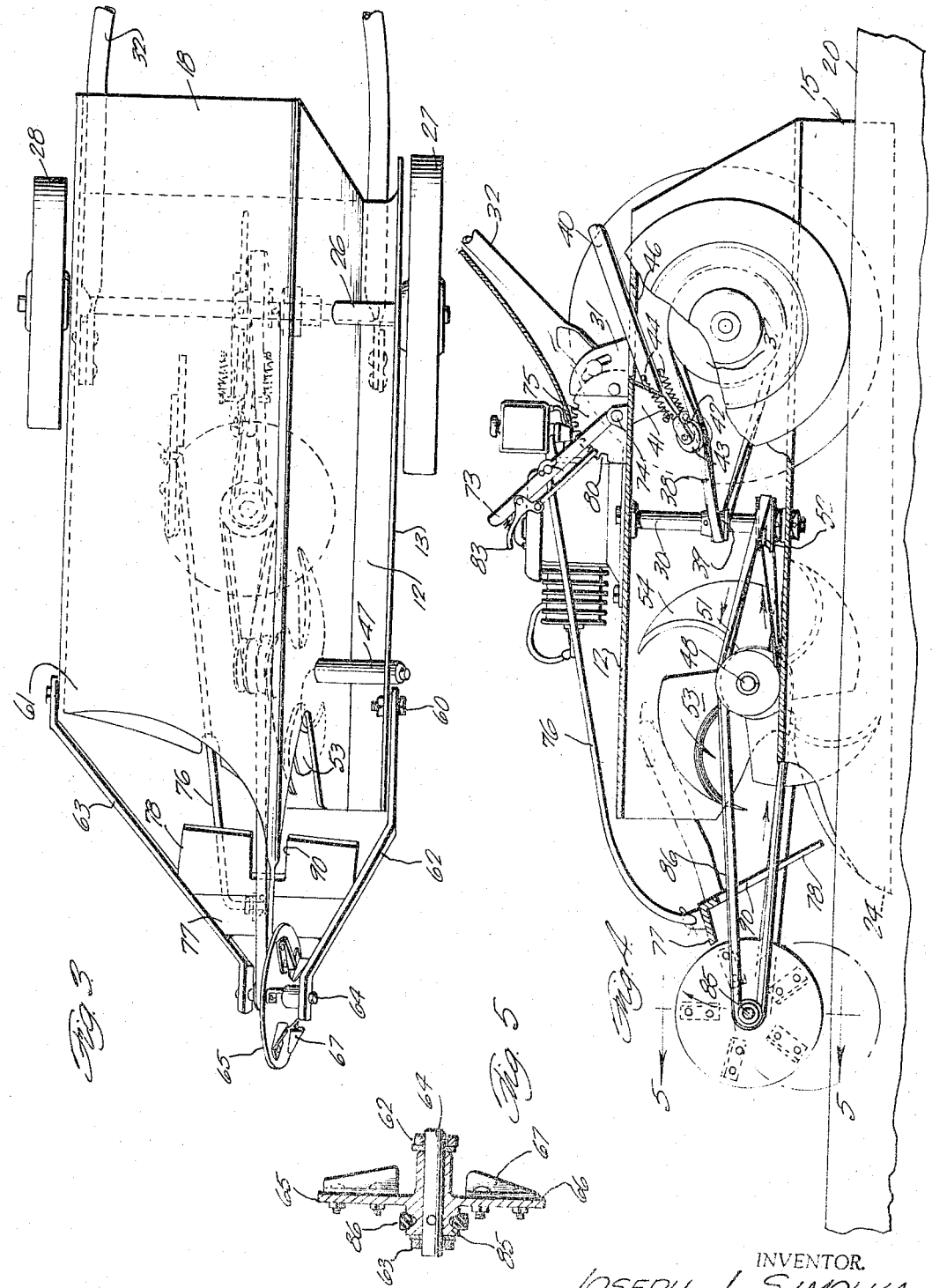

United States Patent Office 3,357,497
Patented Dec. 12, 1967

3,357,497
SIDEWALK EDGER
Joseph J. Simolka, 1611 River Drive,
Watertown, Wis. 53094
Filed May 4, 1965, Ser. No. 453,091
10 Claims. (Cl. 172—16)

ABSTRACT OF THE DISCLOSURE

A lawn edging machine for cutting a groove adjacent the edge of a sidewalk, consisting of a frame mounted on supporting wheels and carrying a drive motor. The frame has a depending V-shaped furrowing shoe in the shape of a plow, extending below ground level, to cut a furrow along the edge of the sidewalk as the machine moves therealong. A cutting wheel is journaled in the shoe and is driven by the motor, the wheel extending adjacent one wall of the V-shaped shoe to engage, shear and crush loosened soil passing through the lower portion of the shoe. An auxiliary cutter disc, also driven by the motor, is provided on the front end of the machine. The auxiliary cutter disc may be lowered to a working position, as required, for example, where the soil is hard and dry.

This invention relates to lawn edging machines, and more particularly to a power-driven machine for forming a groove between a sidewalk and the adjacent lawn area and for neatly and efficiently cutting the grass adjacent the groove.

A main object of the invention is to provide a novel and improved lawn edging machine which is relatively simple in construction, which is easy to operate, and which provides a means of neatly and efficiently cutting a groove between the edge of a sidewalk and the adjacent lawn area.

A further object of the invention is to provide an improved power-driven lawn edging machine which is inexpenisve to manufacture, which is rugged in construction, which is economical to operate, and which is relatively compact in size.

A still further object of the invention is to provide an improved power-driven lawn edging machine for cutting a groove between the edge of a sidewalk and the adjacent lawn area, the machine being provided with positive guiding means which is engageable with the edge of the sidewalk so as to assure accurate and positive guidance of the machine along the margin of the sidewalk, and to assure that the cutting action of the machine will be carefully and completely controlled at all times.

Further objects and advantages of the invention will become apparent from the following description and claims, and from the accompanying drawings, wherein:

FIGURE 1 is a longtiudinal vertical cross-sectional view taken substantially on the line 1—1 of FIGURE 2, and showing the major portion of the machine in side elevation.

FIGURE 2 is a transverse vertical cross-sectional view taken substantially on the line 2—2 of FIGURE 1.

FIGURE 3 is a fragmentary bottom plan view of the lawn edging machine of FIGURES 1 and 2.

FIGURE 4 is a side elevational view, partly in longitudinal vertical cross section, of the lawn edging machine, taken from the opposite side of the machine, as compared with FIGURE 1.

FIGURE 5 is an enlarged vertical cross-sectional view taken substantially on the line 5—5 of FIGURE 4.

Referring to the drawings, 11 generally designates an improved lawn edging machine constructed in accordance with the present invention. The machine 11 comprises a wheeled main frame consisting of a horizontal top plate 12 having a depending, substantially vertical flange 13 at one side thereof and another depending flange 14 at the other side thereof which is integrally formed with a longitudinally extending generally V-shaped furrowing shoe member 15, said furrowing shoe member having a vertical inner wall 16 and an upwardly and outwardly inclined outer wall 17, the inner wall 16 being integrally connected to the bottom edge of flange 14 by a horizontal plate element 18, as is clearly shown in FIGURE 2. The top edge of the upwardly and outwardly inclined wall 17 is rigidly secured to the bottom surface of the plate member 12 at 19.

As is clearly shown on FIGURE 2, the vertical wall 16 is slidably engageable with the side edge of a sidewalk slab 20, the V-shaped shoe member 15 extending below ground level, so that the shoe member cuts a furrow as the machine moves along the edge of the sidewalk slab 20.

As shown on FIGURE 1, the V-shaped furrowing shoe 15 has a bottom edge 22 which slopes downwardly and forwardly, and the front end of the shoe has a plow-like configuration, the forward portions of the top edges of the walls 17 and 16 curving arcuately downwardly and forwardly, as shown at 23, whereby said walls 16 and 17 taper forwardly to define a soil-penetrating front point 24 of generally V-shaped configuration.

Designated at 25 is a transverse axle which is journaled in the depending vertical wall members 13 and 14, being rotatably received in a sleeve member 26 rigidly secured between wall member 13 and the upwardly and outwardly inclined wall member 17. Secured on the ends of the shaft 25 are respective supporting wheels 27 and 28, the outer supporting wheel 27 being larger in diameter than the inner supporting wheel 28, whereby the wheel 28 may be rotatably supported on a sidewalk slab 20 while the wheel 27 is supported on the lawn outwardly adjacent the slab in the manner illustrated in FIGURE 2, allowing the machine to travel along the edge of the slab with the axle 25 substantially in a horizontal position. Mounted on the top horizontal plate element 12 of the main frame is a drive motor, for example, an internal combustion engine 29 having the depending output shaft 30 which extends below the plate element 12. Pivoted to upstanding lugs 31, 31 provided on the side margins of the top plate 12 are the respective arms 32 of a handle assembly 33 of conventional construction. The control elements for the internal combustion engine 29, for example, the throttle control cable 34 is supported on the handle assembly 33 in a conventional manner so as to be operated by the user of the machine by means of a suitable control lever mounted adjacent the crossbar portion 36 of the handle assembly.

A driving pulley 37 is secured on the transverse shaft 25, said pulley being coupled by a belt 38 to another pulley 39 secured on the engine output shaft 30. The belt 38 is placed in tension by means of a manually controlled toggle linkage comprising an operating lever 40 pivoted to a depending lug 41 provided on top plate 12, the lever 40 being employed to control the position of a pivoted yoke 42 carrying a tensioning pulley 43 which is engageable with the belt 38. The yoke 42 is pivoted to the lever 40 at a point spaced from the pivotal connection of the lever to the lug 41 and is resiliently biased by toggle springs 44 connecting the yoke to the lever 40. Thus, in the lowered position of the handle 40, shown in FIGURE 4, the springs 44 act on the yoke 42 to bias the yoke downwardly and to cause the pulley 43 to exert tightening force on the belt 38. This couples the shaft 30 to the axle 25. When the lever 40 is rotated upwardly past its dead center position, the springs 44 cause the yoke 42 to be rotated upwardly away from the belt 38 whereby there is no tensioning force exerted on the belt and there is no torque transmitted from shaft 30 to pulley 37. This uncouples the axle 25 from the motor output shaft 30.

As shown on FIGURE 5, the control lever 40 extends upwardly through a longitudinal slot 46 provided in the rear portion of the horizontal top plate element 12.

Journaled in a sleeve 47 secuered between the lower portion of flange 13 and the inclined shoe wall 17 is a shaft 48, said sleeve 47 and shaft 48 being substantially perpendicular to the inclined shoe wall 17. Secured on the inner portion of the shaft 48 are a relatively large pulley 49 and a smaller pulley 50. The pulley 49 is drivingly connected to the shaft 30 by a belt 51, the belt 51 engaging around the pulley 49 and around a driving pulley 52 secured on shaft 30. Secured on the shaft 48 adjacent and parallel to the inside surface of the shoe wall 17 is a cutter wheel 53 having the arcuately curved tapering substantially spirally shaped outwardly projecting cutting blades 54. As shown on FIGURE 2, the cutting wheel 53 is of substantial size and cooperates with the major portion of the height of wall 17, extending into the lower portion of the V-shaper furrowing shoe 15.

Pivoted to the forward portions of the side flange elements 13 and 14 at 60 and 61, at points substantially in transverse alignment, are respective forwardly and inwardly bent yoke arms 62 and 63 between the forward ends of which is journaled a transverse shaft 64 on which is rotatably mounted an auxiliary cutter wheel 65 provided with substantially radially extending flanged blade elements 66. The blade elements 66 have generally triangular outwardly tapering furrowing cleats or flanges 67 which act as digging elements when engaged in the ground, as will be presently described. The arms 62 and 63 are provided with rearwardly extending upwardly inclined supporting bars 69 which converge toward the lower arms 62 and 63, the supporting bar 69 being provided with guide bolts 70 at the rear ends which engage through arcuate slots 71 provided in the flange members 13 and 14, the slot 71 being concentric with the pivotal connections 60 and 61 so as to guide the supporting frame for the cutting wheel 65 for rotational adjustment around the common transverse axis defined by the substantially transversely aligned pivotal connections 60 and 61. A control lever 73 is centrally pivoted at 74 to a sector plate 75 provided on the horizontal top plate member 12, the lever 73 being connected by a link rod 76 to the top flange 77 of an inclined cross plate 78 secured between the arms 62 and 63 and between their top bar 69. The sector plate 75 is provided with locking teeth 80 and the lever 73 is provided with conventional releasable latch means cooperating with the locking teeth 80 to releasably secure the lever in a selected angular position around the shaft 74 of the lever. Thus, a conventional manually releasable latch lever 83 is pivoted on the top portion of the lever 73 for at times unlocking the lever 73 and permitting it to be angularly adjusted around the sector plate 75.

The inclined cross plate 78 has its bottom edge 84 located so as to limit the penetration of the cutter wheel 65 when it is in its lowere position. Thus, the edge 84 is engageable with the sidewalk slab 20 when the auxiliary frame assembly carrying the cutter wheel 65 is lowered, preventing excessive penetration of the cutter wheel 65 in the soil adjacent the edge of the slab 20, and providing uniform depth of cut of the cutter wheel in forming the desired groove.

However, as will be presently explained, it may be at times desirable to elevate the cutter wheel 65 so that it is not operated, in which case the supporting frame thereof may be lifted by moving the lever 73 rearwardly.

Shaft 64 is provided with a pulley 85 which is drivingly coupled to the pulley 50 on shaft 48 by a belt 86. As shown on FIGURE 1, the shaft 48 is located a short distance rearwardly of the location of the transverse axis defined by the pivotal connections 60 and 61, so that the belt 86 is loosened when the cutter wheel 65 is elevated to the position thereof shown on FIGURE 1, so that it is no longer effective to drive the cutter wheel. However, when the cutter wheel is lowered to its operating position, the belt 86 is placed in tension and driving torque is transmitted from shaft 48 to the cutter wheel.

The upwardly and forwardly inclined stop plate 78 is provided with an intermediate notch 90 through which the belt 86 passes, said notch providing adequate working clearance for the belt.

In operation, where the soil is in a relatively soft and easily penetratable condition, the cutter wheel 65 may be held in its elevated position, as shown on FIGURE 1, and the device may be guided along the sidewalk slab 20 in the manner shown, the pointed front end 24 of the shoe member 15 digging into the soil adjacent to the edge of the slab and cutting the desired groove therein. The loosened soil is engaged by the rotating cutter wheel 54 and is crushed, being discharged through the rear end of the V-shaped shoe member 15 as the machine moves along the edge of the slab. The rotating cutter wheel 53 cooperates wtih the inclined shoe wall 17, to which it is closely adjacent and parallel, whereby to provide a shearing action as well as a crushing action on pieces of sod which pass through the lower portion of the V-shaped shoe member. The result is to provide a groove of desired depth adjacent to the edge of the slab 20, the groove containing pulverized soil and sod fragments.

If the soil is hard or relatively dry and not readily penetratable by the pointed front end portion 24 of the shoe member, the cutter wheel 65 is lowered to working position, said position being determined by engagement of the bottom edge 84 of the stop plate 78 with the top surface of the slab 20. The rotating cutter wheel 65 engages the soil adjacent to the edge of the slab, the triangular flange elements 67 of its teeth 66 digging into the soil and forming the desired groove. The lumps of soil and sod fragments thereafter pass into the bottom portion of the V-shaped shoe member 15 being pulverized therein by the action of the rotating relatively large cutter wheel 53, in cooperation with the inclined outer wall 17 of the shoe as above described.

As above explained, the machine is self propelled, the movement thereof being controlled by the clutch lever 40. When the lever 40 is placed in its lowered position, shown in FIGURE 4, the wheel axle 25 thereof is driven and the machine is moved forwardly. The path of movement of the machine is controlled by the engagement of the vertical wall 16 with the side edge of the slab 20, since the shoe member depends below ground level, namely, level of the bottom of the larger wheel 27, as shown on FIGURE 2. Thus, the desired groove is formed and the groove is of uniform depth and width throughout the length of travel of the machine along sidewalk slab 20.

As will be readily apparent from FIGURE 5, the rear portion of the machine is supported on the wheels 27 and 28, and the forward portion of the machine is supported by the engagement of the bottom edge 84 of the stop plate 78 with the top surface of the sidewalk slab 20, assuming the auxiliary frame supporting the cutter wheel 65 to be in its lowered position. In most instances the aforesaid auxiliary frame will be in a sufficiently lowered position so that the bottom edge 84 will engage the top surface of the slab 20 and provide the desired front support for the machine and consequently the desired adjustment of depth of the groove cut thereby. With the auxiliary frame in its lowermost position a groove of minimum depth will be cut, assuming the forward portion of the machine to be continuously supported on the bottom edge 84 of stop plate 78. The depth of the groove cut by the shoe member 15 can be increased by elevating the auxiliary frame of the cutter wheel 65 by means of lever 73, since the bottom edge 84 will similarly be elevated and will permit the point 24 of the shoe member to travel in a lower position along the edge of slab 20. With the cutter wheel 65 completely elevated, namely, elevated to the maximum extent permitted by grooves 71, the machine will be supported solely on the wheels 27 and 28, and the depth of the groove may then be controlled by the user of the machine through the control thereof provided by the handle bar assembly 33. Thus, a wide range of flexibility of use is afforded, enabling the user to adjust the machine in accordance with prevailing soil conditions and to operate the machine in a manner most suited to said conditions.

The transverse shaft members 48 and 51 are preferably substantially parallel and the respective cutter wheels 54 and 65 are preferably located substantially in the same plane. Thus, the groove formed by the auxiliary cutter wheel 65 is in substantial alignment with the groove formed by the V-shaped shoe member 15.

While a specific embodiment of an improved lawn edging machine has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A lawn edging machine comprising a wheeled main frame adapted to be moved along the edge of a sidewalk adjacent to a lawn, a drive motor on the frame, a depending generally V-shaped longitudinally extending furrowing member secured to said frame and being engageable in the soil adjacent the sidewalk to cut a furrow therein parallel to said edge as the machine moves therealong, transverse shaft means journaled in the frame and extending through the outer wall of the furrowing member, a cutter wheel secured on said shaft means in the furrowing member adjacent said outer wall, means drivingly coupling said shaft means to said drive motor, said main frame including a forwardly-extending auxiliary portion, an auxiliary cutter wheel journaled on said auxiliary frame portion, and means drivingly-coupling said auxiliary cutter wheel to said drive motor.

2. A lawn edging machine comprising a wheeled main frame adapted to be moved along the edge of a sidewalk adjacent to a lawn, a drive motor on the frame, a depending generally V-shaped longitudinally extending furrowing member secured to said frame and being engageable in the soil adjacent the sidewalk to cut a furrow therein parallel to said edge as the machine moves therealong, transverse shaft means journaled in the frame and extending through the outer wall of the furrowing member, a cutter wheel secured on said shaft means in the furrowing member adjacent said outer wall, forwardly extending auxiliary frame means pivoted to the forward portion of the main frame, an auxiliary cutter wheel journaled on the forward portion of said auxiliary frame means and being in a plane substantially parallel to the plane of the first-named cutter wheel, and means drivingly coupling said cutter wheels to said drive motor.

3. A lawn edging machine comprising a wheeled main frame adapted to be moved along the edge of a sidewalk adjacent to a lawn, a drive motor on the frame, a depending generally V-shaped longitudinally extending furrowing member secured to said frame and being engageable in the soil adjacent the sidewalk to cut a furrow therein parallel to said edge as the machine moves therealong, said outer wall being inclined upwardly and outwardly and the inner wall of the V-shaped furrowing member being substantially vertical, transverse shaft means journaled in the frame and extending through the outer wall of the furrowing member, a cutter wheel secured on said shaft means in the furrowing member adjacent said outer wall, forwardly extending auxiliary frame means pivoted to the forward portion of the main frame, an auxiliary cutter wheel journaled on the forward portion of said auxiliary frame means and being in a plane substantially parallel to the plane of the first-named cutter wheel, and means drivingly coupling said cutter wheels to said drive motor.

4. A lawn edging machine comprising a wheeled main frame adapted to be moved along the edge of a sidewalk adjacent to a lawn, a drive motor on the frame, a depending generally V-shaped longitudinally extending furrowing member secured to said frame and being engageable in the soil adjacent the sidewalk to cut a furrow therein parallel to said edge as the machine moves therealong, said outer wall being inclined upwardly and outwardly and the inner wall of the V-shaped furrowing member being substantially vertical, transverse shaft means journaled in the frame and extending through the outer wall of the furrowing member, a cutter wheel secured on said shaft means in the furrowing member adjacent said outer wall, forwardly extending auxiliary frame means pivoted to the forward portion of the main frame, an auxiliary cutter wheel journaled on the forward portion of said auxiliary frame means and being in a plane substantially parallel to the plane of the first-named cutter wheel, means drivingly coupling said cutter wheels to said drive motor, and means to at times releasably secure said auxiliary frame in an elevated position with said auxiliary cutter wheel elevated above ground level.

5. A lawn edging machine comprising a wheeled main frame adapted to be moved along the edge of a sidewalk adjacent to a lawn, a drive motor on the frame, a depending generally V-shaped longitudinally extending furrowing member secured to said frame and being engageable in the soil adjacent the sidewalk to cut a furrow therein parallel to said edge as the machine moves therealong, transverse shaft means journaled in the frame and being located in the furrowing member, a cutter wheel secured on said shaft means inwardly adjacent said outer wall, means drivingly coupling said shaft means to said drive motor, said main frame including a forwardly-extending auxiliary portion, an auxiliary cutter wheel journaled on said auxiliary frame portion, and means drivingly-coupling said auxiliary cutter wheel to said drive motor.

6. A lawn edging machine comprising a wheeled main frame adapted to be moved along the edge of a sidewalk adjacent to a lawn, a drive motor on the frame, a depending generally V-shaped longitudinally extending furrowing member secured to said frame and being engageable in the soil adjacent the sidewalk to cut a furrow therein parallel to said edge as the machine moves therealong, transverse shaft means journaled in the frame and extending through the furrowing member, a cutter wheel secured on said shaft means in the furrowing member inwardly adjacent said outer wall, forwardly extending auxiliary frame means pivoted to the forward portion of the main frame, an auxiliary cutter wheel journaled on the forward portion of said auxiliary frame means and being in a plane substantially parallel to the plane of the first-named cutter wheel, means drivingly coupling said cutter wheels to said drive motor, and supporting means on said auxiliary frame means and being supportingly engageable on the top surface of the sidewalk to limit penetration of the auxiliary cutter wheel in the soil adjacent the sidewalk.

7. A lawn edging machine comprising a wheeled main frame adapted to be moved along the edge of a sidewalk adjacent to a lawn, a drive motor on the frame, a depending generally V-shaped longitudinally extending furrowing member secured to said frame and being engageable in the soil adjacent the sidewalk to cut a furrow therein parallel to said edge as the machine moves therealong, transverse shaft means journaled in the frame and extending through the furrowing member, a cutter wheel secured on said shaft means in the furrowing member adjacent said outer edge, forwardly extending auxiliary frame means pivoted to the forward portion of the main frame, an auxiliary cutter wheel journaled on the forward portion of said auxiliary frame means and being in a plane substantially parallel to the plane of the first-named cutter wheel, means drivingly coupling said cutter wheels to said drive motor, and an upwardly and forwardly inclined transverse supporting plate on said auxiliary frame means rearwardly adjacent said auxiliary cutter wheel and having a transverse bottom edge supportingly engageable on the margin of the sidewalk to limit penetration of the auxiliary cutter wheel in the soil adjacent the sidewalk.

8. A lawn edging machine comprising a wheeled main frame adapted to be moved along the edge of a sidewalk adjacent to a lawn, a drive motor on the frame, a depending generally V-shaped longitudinally extending furrowing member secured to said frame and being engageable in the soil adjacent the sidewalk to cut a furrow therein parallel to said edge as the machine moves therealong, transverse shaft means journaled in the frame and extending through the furrowing member, a cutter wheel secured on said shaft means in the furrowing member inwardly adjacent said outer wall, means drivingly coupling said shaft means to said drive motor, said main frame including a forwardly-extending auxiliary portion, an auxiliary cutter wheel journaled on said auxiliary frame portion, and means drivingly-coupling said auxiliary cutter wheel to said drive motor, said main frame being provixded with inner and outer supporting wheels, the inner wheel being of smaller diameter than the outer wheel and the furrowing member depending between said inner and outer wheels so as to be engageable in the soil.

9. A lawn edging machine comprising a wheeled main frame adapted to be moved along the edge of a sidewalk adjacent to a lawn, a drive motor on the frame, said main frame being provided with inner and outer supporting wheels, the inner wheel being of smaller diameter than the outer wheel, a depending generally V-shaped longitudinally extending furrowing member secured to said frame and depending between said inner and outer wheels so as to be engageable in the soil adjacent the sidewalk to cut a furrow therein parallel to said edge as the machine moves therealong with the inner wheel supported on the sidewalk and the outer wheel supported on the lawn adjacent thereto, transverse shaft means journaled in the frame and extending through the furrowing member, a cutter wheel secured on said shaft means in the furrowing member adjacent said outer wall, forwardly extending auxiliary frame means pivoted to the forward portion of the main frame, an auxiliary cutter wheel journaled on the forward portion of said auxiliary frame means and being in a plane substantially parallel to the plane of the first-named cutter wheel, and means drivingly coupling said drive motor to said cutter wheels and to said outer wheel.

10. A lawn edging machine comprising a wheeled main frame adapted to be moved along the edge of a sidewalk adjacent to a lawn, a drive motor on the frame, said main frame being provided with inner and outer supporting wheels, the inner wheel being of smaller diameter than the outer wheel, a depending generally V-shaped longitudinally extending furrowing member secured to said frame and depending between said inner and outer wheels so as to be engageable in the soil adjacent the sidewalk to cut a furrow therein parallel to said edge as the machine moves therealong with the inner wheel supported on the sidewalk and the outer wheel supported on the lawn adjacent thereto, said outer wall being inclined upwardly and outwardly and the inner wall of the V-shaped furrowing member being substantially vertical, transverse shaft means journaled in the frame and extending through the furrowing member, a cutter wheel secured on said shaft means in the furrowing member inwardly adjacent said outer wall, forwardly extending auxiliary frame means pivoted to the forward portion of the main frame, an auxiliary cutter wheel journaled on the forward portion of said auxiliary frame means and being in a plane substantially parallel to the plane of the first-named cutter wheel, means drivingly coupling said drive motor to said cutter wheels and to said supporting wheels, and means to at times releasably secure said auxiliary frame means in an elevated position with said auxiliary cutter wheel elevated above ground level, and an upwardly and forwardly inclined transverse supporting plate on said auxiliary frame means rearwardly adjacent said auxiliary cutter wheel and having a transverse bottom edge supportingly engageable on the margin of the sidewalk to limit penetration of the auxiliary cutter wheel in the soil adjacent the sidewalk.

References Cited

UNITED STATES PATENTS

| 144,252 | 11/1873 | Brower et al. | 172—17 X |
| 1,970,838 | 8/1934 | Buettner | 172—16 |
| 2,737,105 | 3/1956 | Wilson | 172—17 X |
| 2,847,813 | 8/1958 | Hanson et al. | 56—25.4 |

FOREIGN PATENTS

| 384,497 | 12/1932 | Great Britain. |
| 943,419 | 12/1963 | Great Britain. |

ABRAHAM G. STONE, *Primary Examiner.*

J. R. OAKS, *Assistant Examiner.*